US010600393B2

(12) United States Patent
Poulin

(10) Patent No.: US 10,600,393 B2
(45) Date of Patent: Mar. 24, 2020

(54) ONE-PIECE VALVE CLUSTER FOR BRASS INSTRUMENTS

(71) Applicant: Michael James Poulin, Jacksonville, NC (US)

(72) Inventor: Michael James Poulin, Jacksonville, NC (US)

( * ) Notice: Subject to any disclaimer, the term of this patent is extended or adjusted under 35 U.S.C. 154(b) by 0 days.

(21) Appl. No.: 16/353,971

(22) Filed: Mar. 14, 2019

(65) Prior Publication Data

US 2019/0287498 A1 Sep. 19, 2019

Related U.S. Application Data

(60) Provisional application No. 62/642,844, filed on Mar. 14, 2018.

(51) Int. Cl.
*G01D 9/04* (2006.01)
*G10D 9/04* (2020.01)

(52) U.S. Cl.
CPC .................................... *G10D 9/04* (2013.01)

(58) Field of Classification Search
CPC ..................................................... G10D 9/04
See application file for complete search history.

(56) References Cited

U.S. PATENT DOCUMENTS

| | | | | | |
|---|---|---|---|---|---|
| 412,753 | A * | 10/1889 | Hite | G10D 9/04 | 84/388 |
| 1,708,259 | A * | 4/1929 | Charlton | G10D 9/04 | 84/390 |
| 2,608,899 | A * | 9/1952 | Lisi | G10D 9/04 | 84/388 |
| 3,686,995 | A * | 8/1972 | Marzan | G10D 7/10 | 84/389 |
| 4,112,806 | A * | 9/1978 | Thayer | G10D 9/04 | 84/390 |
| 5,900,563 | A * | 5/1999 | Leonard | G10D 9/04 | 84/389 |
| 7,501,566 | B2 * | 3/2009 | Glazer | G10D 7/10 | 84/388 |
| 7,999,164 | B2 * | 8/2011 | Satomi | G10D 9/04 | 84/380 R |
| 8,138,405 | B2 * | 3/2012 | Hsiao | F16K 5/02 | 84/394 |
| 9,087,495 | B2 * | 7/2015 | Sanders | G10D 9/04 | |

(Continued)

*Primary Examiner* — Robert W Horn

(57) ABSTRACT

A one-piece valve cluster for brass instruments that facilitates ease-of-maintenance and ease-of-repair includes an upper housing, a lower housing, a plurality of first bisected-casings, a plurality of second bisected-casings, a plurality of first bisected-ports, and plurality of second bisected-ports. The plurality of first bisected-casings and the plurality of first bisected-ports are fashioned into a first-milling face of the upper housing. Similarly, the plurality of second bisected-casings and the plurality of second bisected-ports are fashioned into a second-milling face of the lower housing. The upper housing is mounted to the lower housing to create a single piece valve cluster that can easily installed on the instrument. More specifically, the first-milling face is positioned coincident to the second-milling face. Once mounted, each first bisected-casing is positioned concentric to a corresponding second bisected-casing to form a single cylindrical casing for housing a rotor plug.

14 Claims, 6 Drawing Sheets

(56) References Cited

U.S. PATENT DOCUMENTS

| | | | | |
|---|---|---|---|---|
| 9,396,711 | B2 * | 7/2016 | John ........................ | G10D 9/04 |
| 2019/0189092 | A1 * | 6/2019 | Clissold .................. | G10D 9/04 |
| 2019/0287498 | A1 * | 9/2019 | Poulin ..................... | G10D 9/04 |

* cited by examiner

ONE-PIECE VALVE CLUSTER FOR BRASS INSTRUMENTS

The current application claims a priority to the U.S. Provisional Patent application Ser. No. 62/642,844 filed on Mar. 14, 2018.

FIELD OF THE INVENTION

The present invention generally relates to a one-piece valve cluster for brass instruments. More specifically, the present invention is a rotary valve assembly wherein the components are milled into solid pieces of metal that can be easily assembled and disassembled for ease of maintenance and repair.

BACKGROUND OF THE INVENTION

Rotary valves selectively enable the airflow through a passage or passages that lead into attached pipes. The overall design of rotary valves has not changed since they were first invented in the 1800's. Rotary valves have been in use for hundreds of years in a multitude of different applications. Rotary valves are particularly popular in brass instruments where they are used to regulate airflow into the length of the instrument when rotated in the desired angle. In conventional brass instruments, the rotary valves are made by brazing multiple pieces of tubing to create the pipes that allow the flow of air through the instruments. A rotor plug with passages fashioned into the sides is used to adjust the air flow through the pipes. However, this method of making rotary valve is very time consuming, often requiring up to ninety hours of labor, and is also extremely expensive to repair when the valve ware causes noise and leakage of air. Further, most parts are friction fit, which also causes issues when conducting routine maintenance and cleaning.

The present invention is a one-piece rotary valve cluster for brass musical instruments that is an update on the time-tested design built with the craftsman and repair technician in mind.

The one-piece rotary valve cluster provides instrument repair technicians the opportunity for easier repair and cleaning than the traditional rotary valve casings.

The one-piece rotary valve cluster provides a quicker turnaround time for the craftsman during the construction of a rotary valve brass musical instrument by drastically lowering the labor to produce the valve cluster compared to traditional rotary valve casings.

DETAILED DESCRIPTION OF THE INVENTION

All illustrations of the drawings are for the purpose of describing selected versions of the present invention and are not intended to limit the scope of the present invention.

Figure 1:
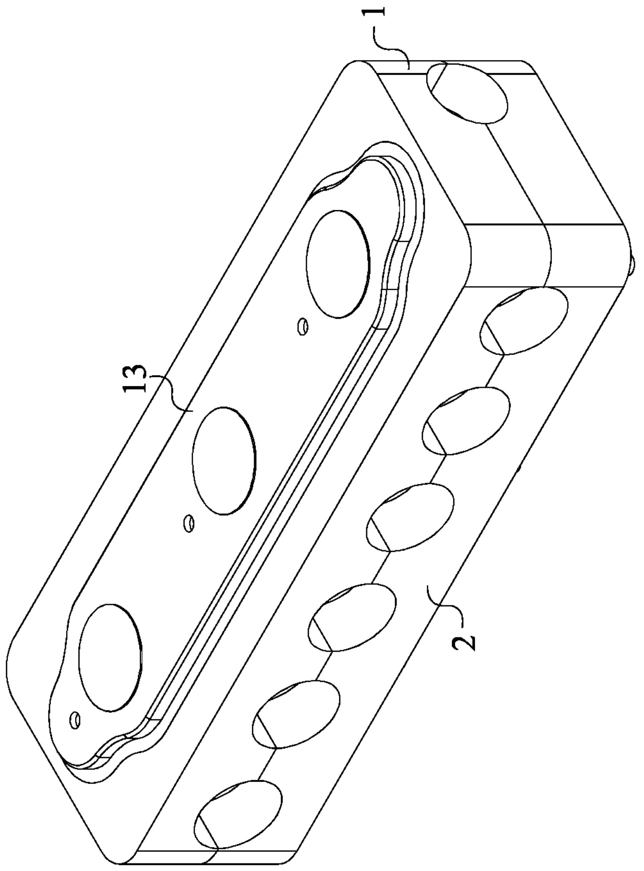
FIG. 1 is a top view of the present invention with the upper housing mounted to the lower housing.
Figure 2:
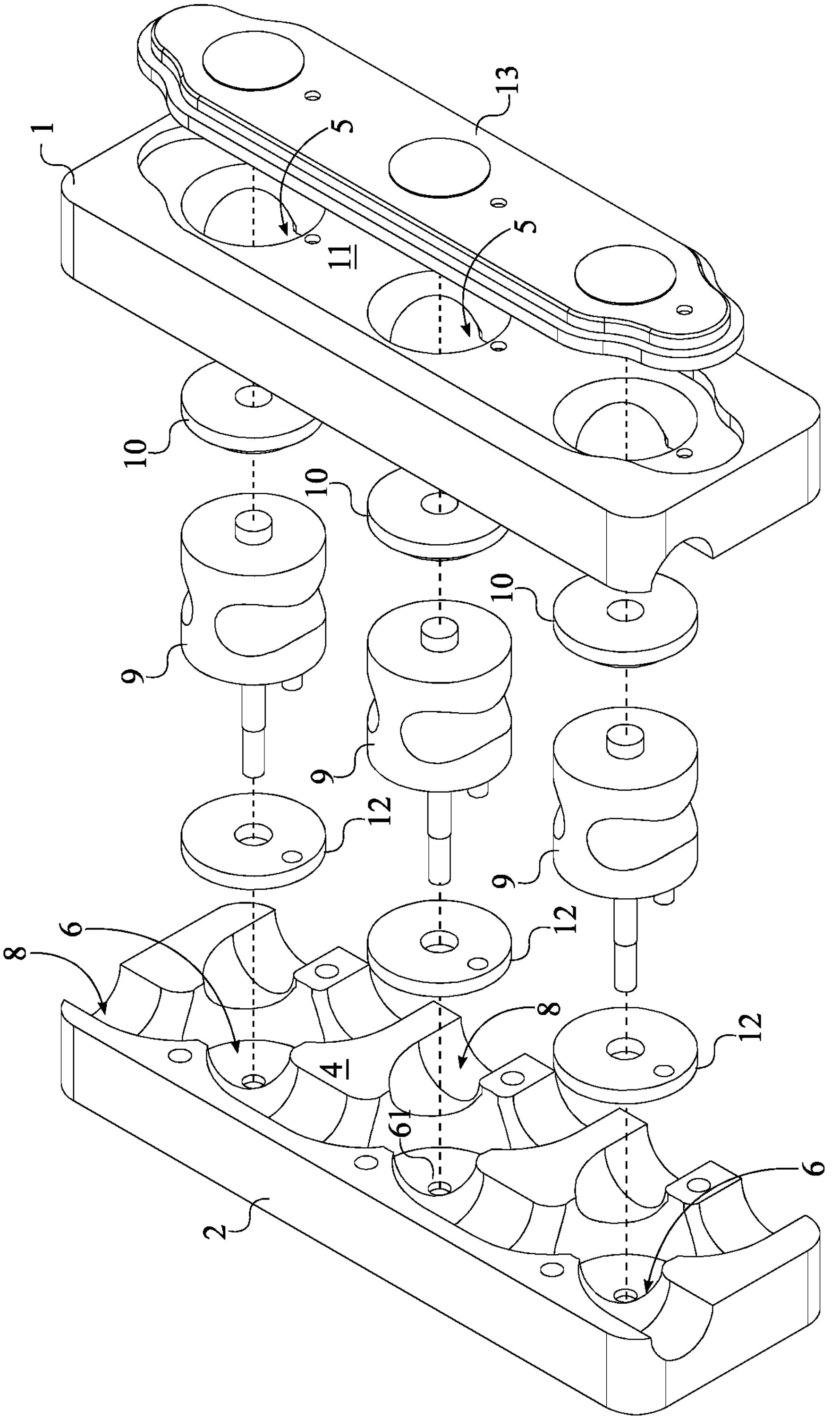
FIG. 2 is a top exploded view of the present invention rotate 90-degrees showing the plurality of rotary plugs contained within the lower housing and the upper housing.

The present invention is a one-piece valve cluster for brass instruments that cuts down initial labor costs and future repair costs. Brass instruments, as herein referred to, includes but is not limited to horns, trumpets, trombones, flugelhorns, tubas, and the like. Referring to FIG. 1 and FIG. 2, the present invention comprises an upper housing 1, a lower housing 2, a plurality of first bisected-casings 5, a plurality of second bisected-casings 6, a plurality of first bisected-ports 7, and a plurality of second bisected-ports 8. The upper housing 1 and the lower housing 2 are machined out of solid pieces of metal. In the preferred embodiment, the upper housing 1 is mounted to the lower housing 2. More specifically, the upper housing 1 is bolted onto the lower housing 2 for ease of assembly and disassembly. This allows the present invention to be disassembled for routine maintenance and cleaning. Unlike conventional valve clusters that use friction fitted components, the present invention uses components that are milled directly into the upper housing 1 and the lower housing 2. This greatly lowers the labor required to manufacture the present invention. This also eliminates the need for solder, thereby alleviating the possibility of exposing the user to lead based solders or the solder breaking. In the preferred implementation, the upper housing 1 and the lower housing 2 are assembled into a single piece and fitted into the instrument via O-rings to prevent air leakage.

Figure 4:
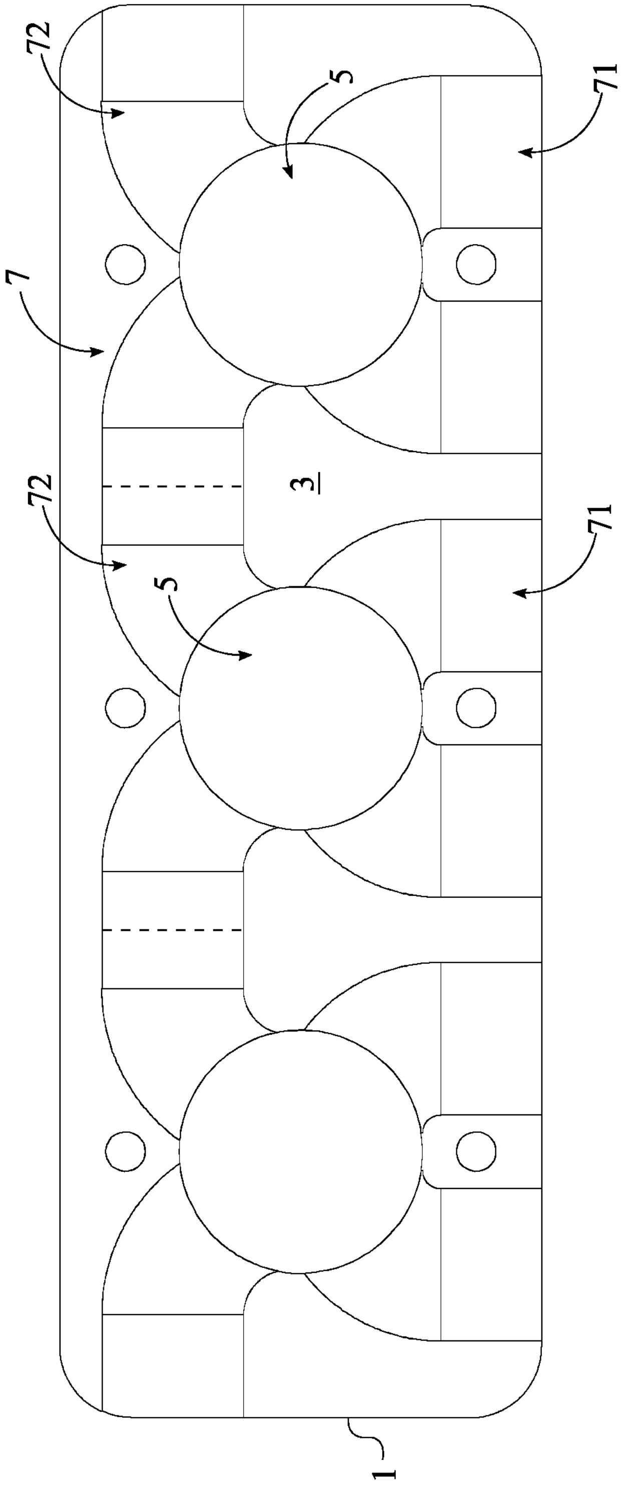
FIG. 4 is a top view of the upper housing showing the plurality of first bisected-ports and the plurality of first bisected-casings fashioned into the first-milling face.

Referring to FIG. 2 and FIG. 4, in the preferred embodiment, the plurality of first bisected-casings 5 is milled into the upper housing 1. As such, the upper housing 1 comprises a first-milling face 3 and a top surface 11. In the preferred embodiment of the present invention, the top surface 11 is an indentation for a housing cover 13. The housing cover 13 can be removed from the upper housing 2 to easily remove the plurality of rotor plugs 9. Similarly, the lower housing 2 comprises a second-milling face 4 and a guide surface 61. The plurality of second bisected-casings 6 is milled into the lower housing 2. The guide surface 61 helps guide the rotor plug as it rotates. In the preferred embodiment, the guide surface 61 is milled into the lower housing 2. In an alternate embodiment, the guide surface 61 may be integrated into a detachable plate cover mounted onto the lower housing 2.

In the preferred implementation, each of the plurality of first bisected-casings 5 holds an upper portion of the rotor plug in the operative configuration. Accordingly, each of the plurality of second bisected-casings 6 holds a lower portion of the rotor plug. To enable this, the plurality of first bisected-casings 5 traverses through the upper housing 1, from the top surface 11 to the first-milling face 3. Similarly, the plurality of second bisected-casings 6 traverses through the lower housing 2 to the second-milling face 4. Each first bisected-casing 5 is positioned concentric to a corresponding second bisected-casing. In the operative configuration, an arbitrary first bisected-casing is mounted on top an arbitrary second bisected-casing to form a cylindrical casing which encloses the rotor plug. As such, each first bisected-casing 5 is a cylindrical cavity sized to fit the top of the rotor plug.

In contrast, each second bisected-casing 6 is a cylindrical cavity to fit the bottom of the rotor plug.

Referring more specifically to FIG. 4, each of the plurality of first bisected-ports 7 is a semi-circular cut made into the first-milling face 3. As such, the plurality of first bisected-ports 7 traverses into the upper housing 1 from the first-milling face 3. Similarly, the plurality of second bisected-ports 8 is a semi-circular cut made into the second-milling face 4. As such, the plurality of second bisected-ports 8 traverses into the lower housing 2 from the second-milling face 4.

Referring to FIG. 2 and FIG. 4, to assemble the present invention, the first-milling face 3 is positioned coincident to the second-milling face 4. Once the upper housing 1 is mounted to the lower housing 2, the plurality of first bisected-ports 7 and the plurality of second bisected-ports 8 come together to form circular air passages enabling airflow into the corresponding first bisected-port.

Referring more specifically to FIG. 4, the plurality of first bisected-ports 7 includes a plurality of U-shaped ports 71 and a plurality of transverse ports 72. Each U-shaped port 71 traverses through an arbitrary bisected-casing from the plurality of first bisected-casings 5. Further, each transverse port 72 also traverses through the arbitrary bisected-casing.

Referring back to FIG. 3, the plurality of second bisected-ports 8 includes a plurality of U-shaped ports 71 and a plurality of transverse ports 72. Each U-shaped port 71 traverses through an arbitrary bisected-casing from the plurality of second bisected-casings 6. Each transverse port 72 traverses through the arbitrary bisected-casing.

In the preferred implementation, each U-shaped port 71 from the plurality of first bisected-ports 7 is mounted on top of a corresponding U-shaped port 71 from the plurality of second bisected-ports 8. This creates a looping air passage into the cylindrical casing that holds the rotor plug. Similarly, each transverse port 72 from the plurality of first bisected-ports 7 is mounted on top of a corresponding traverse port 72 from the plurality of second bisected-ports 8. This creates a transverse air passage through the cylindrical casing. When the user presses on the rotor plug 9, air entering the transverse air passage is directed into the looping air passage, thereby changing the pitch of the instrument. Depending on how much the user presses on the rotor plug, the rotor plug may only partially rotate. This allows the user to adjust how much air passes through the transverse air passage and the looping air passage, thereby allowing incremental changes to the pitch.

Figure 5:
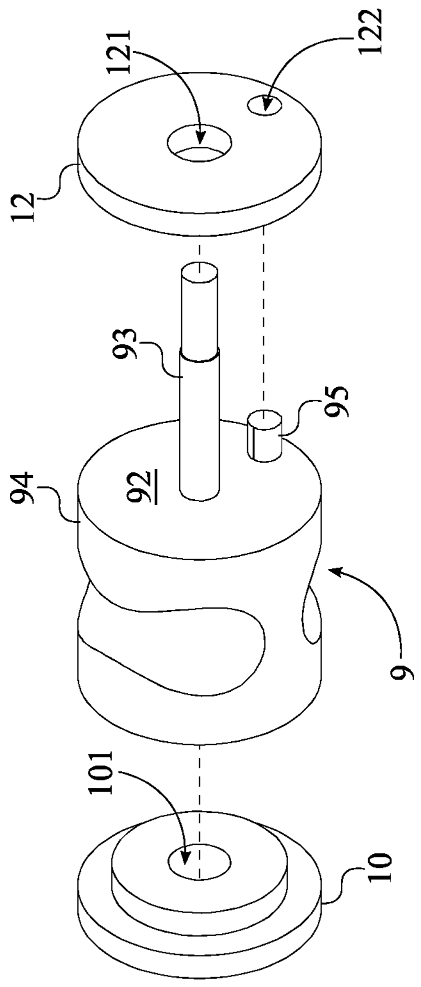
FIG. 5 is a bottom perspective view of the rotary plug rotated 90-degrees showing the lower bearing mounted to the second face.
Figure 6:
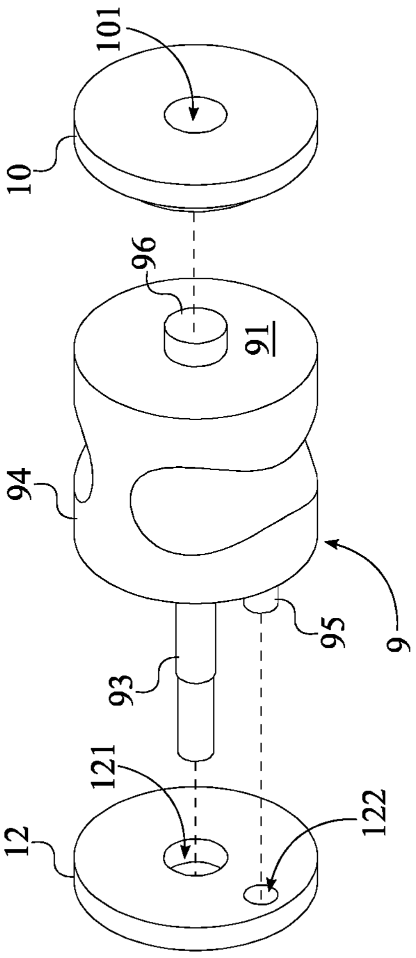
FIG. 6 is a top perspective view of the rotary plug rotated 90-degrees showing the upper spacer mounted to the first face.

Referring to FIG. 2, FIG. 5, and FIG. 6, focusing now on the rotor plug, the present invention utilizes a plurality of rotor plugs 9. Each of the plurality of rotor plugs 9 comprises a first face 91, a second face 92, a rotor stem 93, a rotor body 94, a guide tab 95, and a placement tab 96. In the preferred implementation, a button is mounted on top of the rotor stem 93 to help the user press down on the rotor plug. Accordingly, the rotor plug rotates when the presses on the button, thereby changing the pitch of the instrument. Each rotor plug 9 is mounted concentric to a corresponding first bisected-casing and a corresponding second bisected-casing. This allows the rotor body 94 to rotate with ease. The first face 91 is positioned opposite the second face 92 about the rotor body 94. Further, a first air passage and a second air passage are fashioned into the side of the rotor body 91 to allow air to pass through the transverse air passage and the looping air passage. Preferably, when the user presses on the rotor stem 93, the rotor body 91 rotates 90-degrees to direct airflow through the transverse air passage and the looping air passage. In the preferred embodiment, the first face 91 is enclosed within the corresponding first bisected-casing. In contrast, the second face 92 is enclosed within the corresponding second bisected-casing 8. The rotor stem 93 extends out of the second bisected-casing 8, thereby enabling the user to press the rotor stem 93. As such, the rotor stem 93 is concentrically connected onto the second face 92. The guide tab 95 ensures that the rotor plug remains concentric to the corresponding first bisected-casing and the corresponding second bisected-casing 8 when rotating. As such, the guide tab 95 extends out of the second face 92 adjacent to the rotor stem 93. The placement tab 96 secures the first face 91 of the rotor plug in the proper position and preserves the vertical alignment. As such, the placement tab 96 is concentrically connected onto the first face 91, opposite the rotor stem 93.

Referring to FIG. 2, FIG. 4, and FIG. 6, an upper spacer 10 is provided with each of the plurality of rotor plugs 9. The upper spacer 10 is positioned between the first face 91 and the top surface 11. The upper spacer 10 helps secure the first face 91 of the rotor plug in the proper position. As such, the first face 91 is positioned adjacent to the top surface 11. This allows the upper spacer 10 to engage with the placement tab 96. Accordingly, the placement tab 96 concentrically traverses through a spacer hole 101 of the upper spacer 10. To enable this, the diameter of the spacer hole 101 is equal to the diameter of the placement tab 96.

Referring back to FIG. 2, a housing cover 13 encloses the top surface 11 of the upper housing 1. The housing cover 13 is externally mounted onto the top surface 11. The preferred housing cover 13 is a flat plate that provides support for first face 91 of the plurality of rotor plugs 9. More specifically, the plurality of first bisected-casings 5 is enclosed by the housing cover 13.

Figure 3:
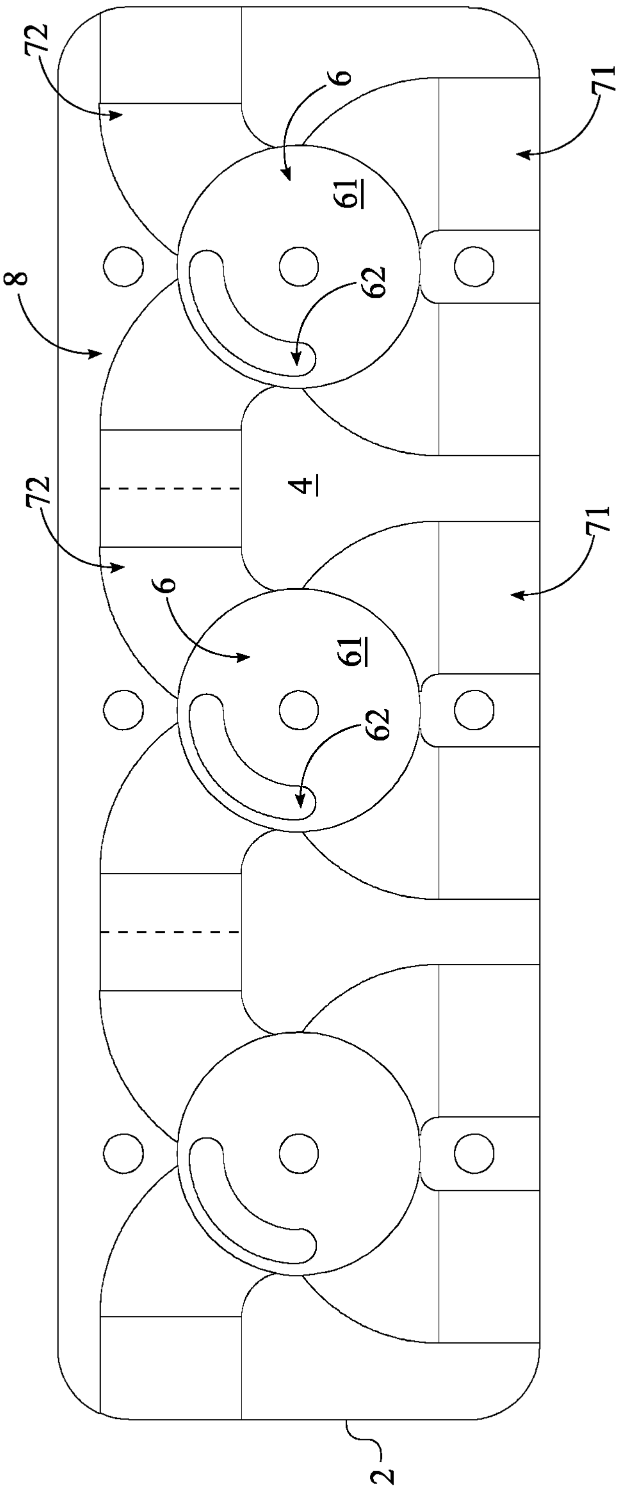
FIG. 3 is a top view of the lower housing showing the plurality of second bisected-ports and the plurality of second bisected-casings fashioned into the second-milling face.

Referring to FIG. 2, FIG. 3, FIG. 5, similarly, a lower bearing 12 and a guide track 62 is provided with each of the plurality of rotor plugs 9. The lower bearing 12 secures the second face 92 of the rotor plug in the proper position. As such, the second face 92 is positioned adjacent to the guide surface 61 of the corresponding second bisected-casing. Further, the lower bearing 12 is positioned between the second face 92 and the guide surface 61. As such, the lower bearing 12 protects the second face 92 from rubbing against the guide surface 61 of the corresponding second bisected-casing. To ensure proper alignment, the placement tab 96 concentrically traverses through a central hole 121 of the lower bearing 12. Further, the guide tab 95 traverses through a distal cavity 122 of the lower bearing 12. As such, the lower bearing 12 is positioned between the second face 92 and the guide surface 61. In contrast, the guide track 62 also allows the rotor plug to rotate smoothly. As such, the guide tab 95 traverses through a distal cavity 122 of the lower bearing 12. The guide track 62 is a circular track designed to preserve the concentric alignment of the rotor plug when rotating. Preferably, the guide track 62 traverses into the guide surface 61 of the corresponding second bisected-casing. The guide tab 95 is slidably engaged with the guide track 62.

In the preferred embodiment, the guide surface 61 is integrated onto the lower housing 2. This lowers the number of components required to assemble the present invention and facilitates ease of maintenance and repair.

In an alternate embodiment, a detachable place cover is provided. The guide surface 61 is integrated onto the detachable plate cover. As such, the guide cover is mounted onto the lower housing 2 at the time of assembly. This design is used for ease of manufacturing and assembly.

Although the invention has been explained in relation to its preferred embodiment, it is to be understood that many other possible modifications and variations can be made without departing from the spirit and scope of the invention as hereinafter claimed.

What is claimed is:

1. A one-piece valve cluster for brass instruments that comprises:

an upper housing;

a lower housing;

a plurality of first bisected-casings;

a plurality of second bisected-casings;

a plurality of first bisected-ports;

a plurality of second bisected-ports;

the upper housing comprises a first-milling face and a top surface;

the lower housing comprises a second-milling face and a guide surface;

the plurality of first bisected-casings traversing through the upper housing, from the top surface to the first-milling face;

the plurality of second bisected-casings traversing into the lower housing from the second-milling face to the guide surface;

the plurality of first bisected-ports traversing into the upper housing from the first-milling face;

the plurality of second bisected-ports traversing into the lower housing from the second-milling face;

the upper housing being mounted to the lower housing;

the first-milling face being positioned coincident to the second-milling face; and a corresponding first bisected-casing from the plurality of first bisected-casings being positioned concentric to a corresponding second bisected-casing from the plurality of second bisected-casings.

2. The one-piece valve duster for brass instruments as claimed in claim 1 comprises:

the plurality of first bisected-ports includes a plurality of U-shaped ports and a plurality of transverse ports;

each U-shaped port traversing through an arbitrary bisected-casing from the plurality of first bisected-casings; and each transverse port traversing through the arbitrary bisected-casing.

3. The one-piece valve cluster for brass instruments as claimed in claim 1 comprises:

the plurality of second bisected-ports includes a plurality of U-shaped ports and a plurality of transverse ports;

each U-shaped port traversing through an arbitrary bisected-casing from the plurality of second bisected-casings; and each transverse port traversing through the arbitrary bisected-casing.

4. The one-piece valve cluster for brass instruments as claimed in claim 1 comprises:

a plurality of rotor plugs;

each of the plurality of rotor plugs comprises a first face, a second face, a rotor stem, a rotor body, a guide tab, and a placement tab;

each rotor plug being mounted concentric to a corresponding first bisected-casing and a corresponding second bisected-casing;

the first face being positioned opposite the second face about the rotor body;

the rotor stem being concentrically connected onto the second face;

the guide tab extending out of the second face adjacent to the rotor stem; and the placement tab being concentrically connected onto the first face, opposite the rotor stem.

5. The one-piece valve cluster for brass instruments as claimed in claim 4 comprises:

an upper spacer;

the first face being positioned adjacent to the top surface;

the upper spacer being positioned between the first face and the top surface; and the placement tab concentrically traversing through a spacer hole of the upper spacer.

6. The one-piece valve cluster for brass instruments as claimed in claim 1 comprises:

a housing cover;

the housing cover being externally mounted onto the top surface; and the plurality of first bisected-casings being enclosed by the housing cover.

7. The one-piece valve cluster for brass instruments as claimed in claim 4 comprises:

a lower bearing;

a guide track;

the second face being positioned adjacent to the guide surface of the corresponding second bisected-casing;

the lower bearing being positioned between the second face and the guide surface;

the placement tab concentrically traversing through a central hole of the lower bearing;

the guide tab traversing through a distal cavity of the lower bearing;

the guide track traversing into the guide surface of the corresponding second bisected-casing; and the guide tab being slidably engaged with the guide track.

8. The one-piece valve cluster for brass instruments as claimed in claim 7, wherein the guide surface being integrated onto the lower housing.

9. A one-piece valve cluster for brass instruments that comprises:

an upper housing;

a lower housing;

a plurality of first bisected-casings;

a plurality of second bisected-casings;

a plurality of first bisected-ports;

a plurality of second bisected-ports;

the upper housing comprises a first-milling face and a top surface;

the lower housing comprises a second-milling face and a guide surface;

the plurality of first bisected-casings traversing through the upper housing, from the top surface to the first-milling face;

the plurality of second bisected-casings traversing into the lower housing from the second-milling face to the guide surface;

the plurality of first bisected-ports traversing into the upper housing from the first-milling face;

the plurality of second bisected-ports traversing into the lower housing from the second-milling face;

the upper housing being mounted to the lower housing;

the first-milling face being positioned coincident to the second-milling face;

a corresponding first bisected-casing from the plurality of first bisected-casings being positioned concentric to a corresponding second bisected-casing from the plurality of second bisected-casings;

the plurality of first bisected-ports includes a plurality of U-shaped ports and a plurality of transverse ports;

each U-shaped port traversing through an arbitrary bisected-casing from the plurality of first bisected-casings;

each transverse port traversing through the arbitrary bisected-casing;

the plurality of second bisected-ports includes a plurality of U-shaped ports and a plurality of transverse ports;

each U-shaped port traversing through an arbitrary bisected-casing from the plurality of second bisected-casings; and each transverse port traversing through the arbitrary bisected-casing.

10. The one-piece valve duster for brass instruments as claimed in claim 9 comprises:

a plurality of rotor plugs;

each of the plurality of rotor plugs comprises a first face, a second face, a rotor stem, a rotor body, a guide tab, and a placement tab;

each rotor plug being mounted concentric to a corresponding first bisected-casing and a corresponding second bisected-casing;

the first face being positioned opposite the second face about the rotor body;

the rotor stem being concentrically connected onto the second face;

the guide tab extending out of the second face adjacent to the rotor stem; and the placement tab being concentrically connected onto the first face, opposite the rotor stem.

11. The one-piece valve cluster for brass instruments as claimed in claim 10 comprises:

an upper spacer;

the first face being positioned adjacent to the top surface;

the upper spacer being positioned between the first face and the top surface; and the placement tab concentrically traversing through a spacer hole of the upper spacer.

12. The one-piece valve cluster for brass instruments as claimed in claim 10 comprises:

a lower bearing;

a guide track;

the second face being positioned adjacent to the guide surface of the corresponding second bisected-casing;

the lower bearing being positioned between the second face and the guide surface;

the placement tab concentrically traversing through a central hole of the lower bearing;

the guide tab traversing through a distal cavity of the lower bearing;

the guide track traversing into the guide surface of the corresponding second bisected-casing; and the guide tab being slidably engaged with the guide track.

13. The one-piece valve cluster for brass instruments as claimed in claim 12, wherein the guide surface being integrated onto the lower housing.

14. The one-piece valve cluster for brass instruments as claimed in claim 9 comprises:

a housing cover;

the housing cover being externally mounted onto the top surface; and the plurality of first bisected-casings being enclosed by the housing cover.

* * * * *